United States Patent

[11] 3,618,959

| [72] | Inventor | Milan E. Gerard |
| --- | --- | --- |
| | | Chula Vista, Calif. |
| [21] | Appl. No. | 848,764 |
| [22] | Filed | Aug. 16, 1968 |
| [23] | | Division of Ser. No. 520,002, Jan. 11, 1966, Pat. No. 3,435,185 |
| [45] | Patented | Nov. 9, 1971 |
| [73] | Assignee | Rohr Corporation |
| | | Chula Vista, Calif. |

[54] LATERALLY SLIDABLE SEALED JOINT
4 Claims, 18 Drawing Figs.

[52] U.S. Cl.................................................. 277/1,
277/135, 285/10, 220/45
[51] Int. Cl..................................................... F16j 15/14,
F16j 15/40, B65d 53/06
[50] Field of Search............................................ 277/135, 1;
285/10, 11; 220/45

[56] References Cited
UNITED STATES PATENTS

| 1,402,645 | 1/1922 | Peress............................ | 285/10 |
| --- | --- | --- | --- |
| 2,215,686 | 9/1940 | Buchet........................... | 277/135 X |
| 1,194,146 | 8/1916 | Cummins........................ | 277/135 X |
| 1,784,104 | 12/1930 | Masterson et al............... | 277/135 X |
| 2,557,140 | 6/1951 | Razdowitz...................... | 277/135 X |

FOREIGN PATENTS

| 532,657 | 1/1941 | Great Britain................ | 285/10 |
| --- | --- | --- | --- |
| 870,351 | 12/1959 | Great Britain................ | 285/10 |

Primary Examiner—Samuel B. Rothberg
Attorney—George E. Pearson

ABSTRACT: Open-ended inner and outer walking chambers have a liquid-sealed sliding connection between them, and the outer chamber has a similar liquid-sealed sliding connection with the high vacuum chamber of an electron beam gun whose beam passes through the liquid-sealed chambers to impinge upon the surface of a workpiece.

The open ends of the walking chambers have inflatable seals which, upon being inflated, move to engage the work surface in releasable locking engagement therewith. The walking chambers also have pneumatic motors and metering devices to index the chambers relative to the beam.

A walking seal system, including the pneumatic motors, metering devices, valves, and associated elements and circuitry, operates cyclically to alternately inflate the chamber end seals, evacuate the walking chambers, and actuate the indexing motors to advance the chambers relative to the beam while maintaining therewithin the required low-order vacuum environment for the beam as it moves relative to the workpiece.

PATENTED NOV 9 1971 3,618,959

INVENTOR.
M. E. GERARD
BY George E. Pearson
ATTORNEY

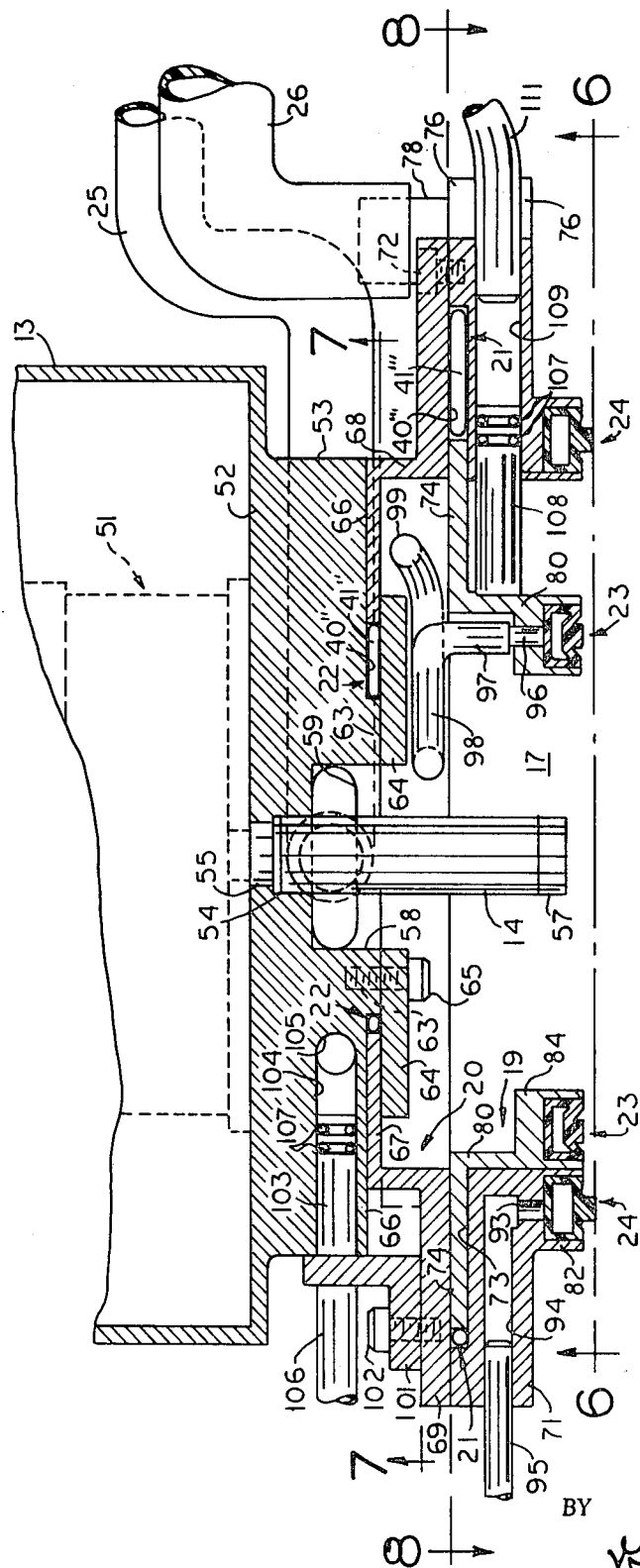

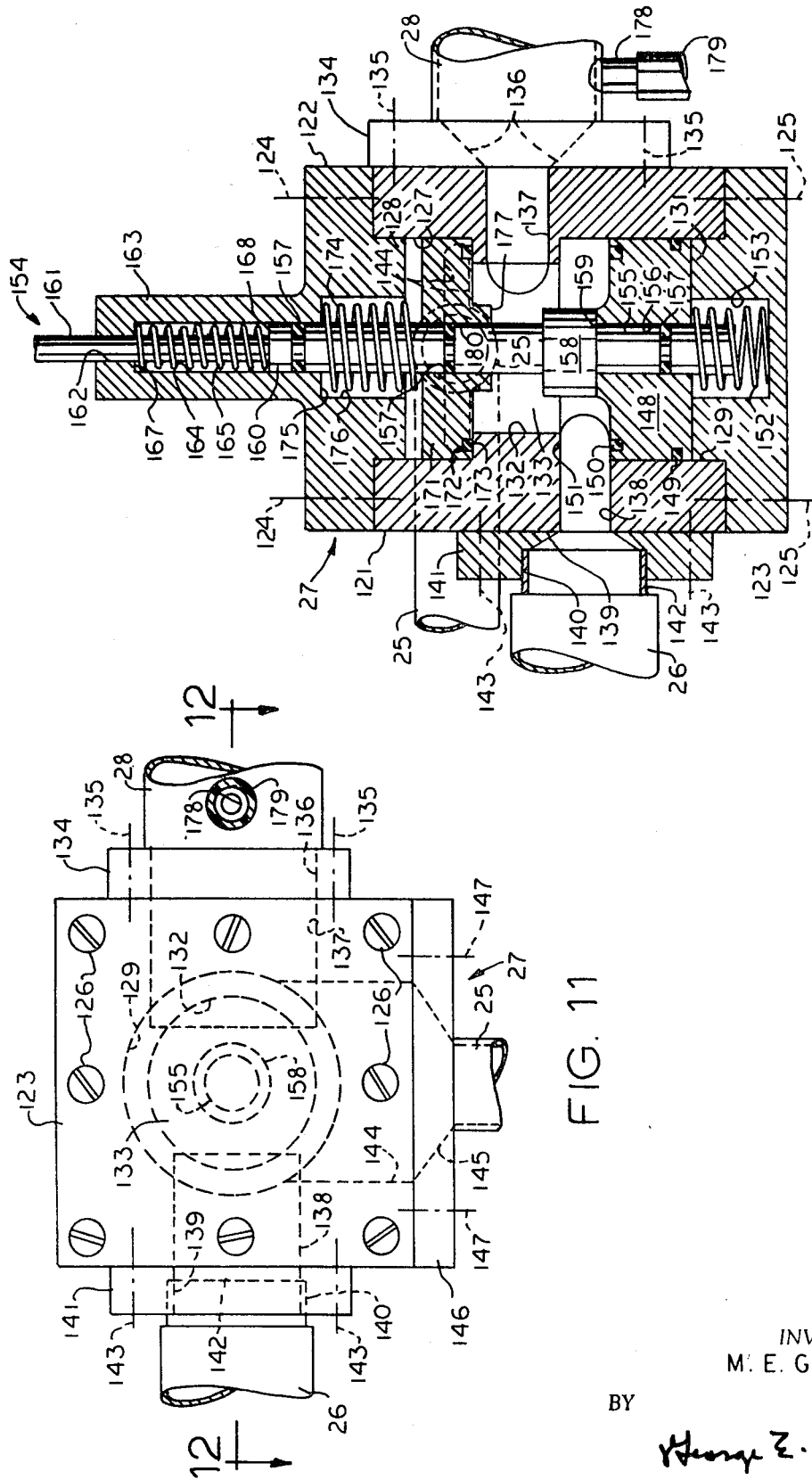

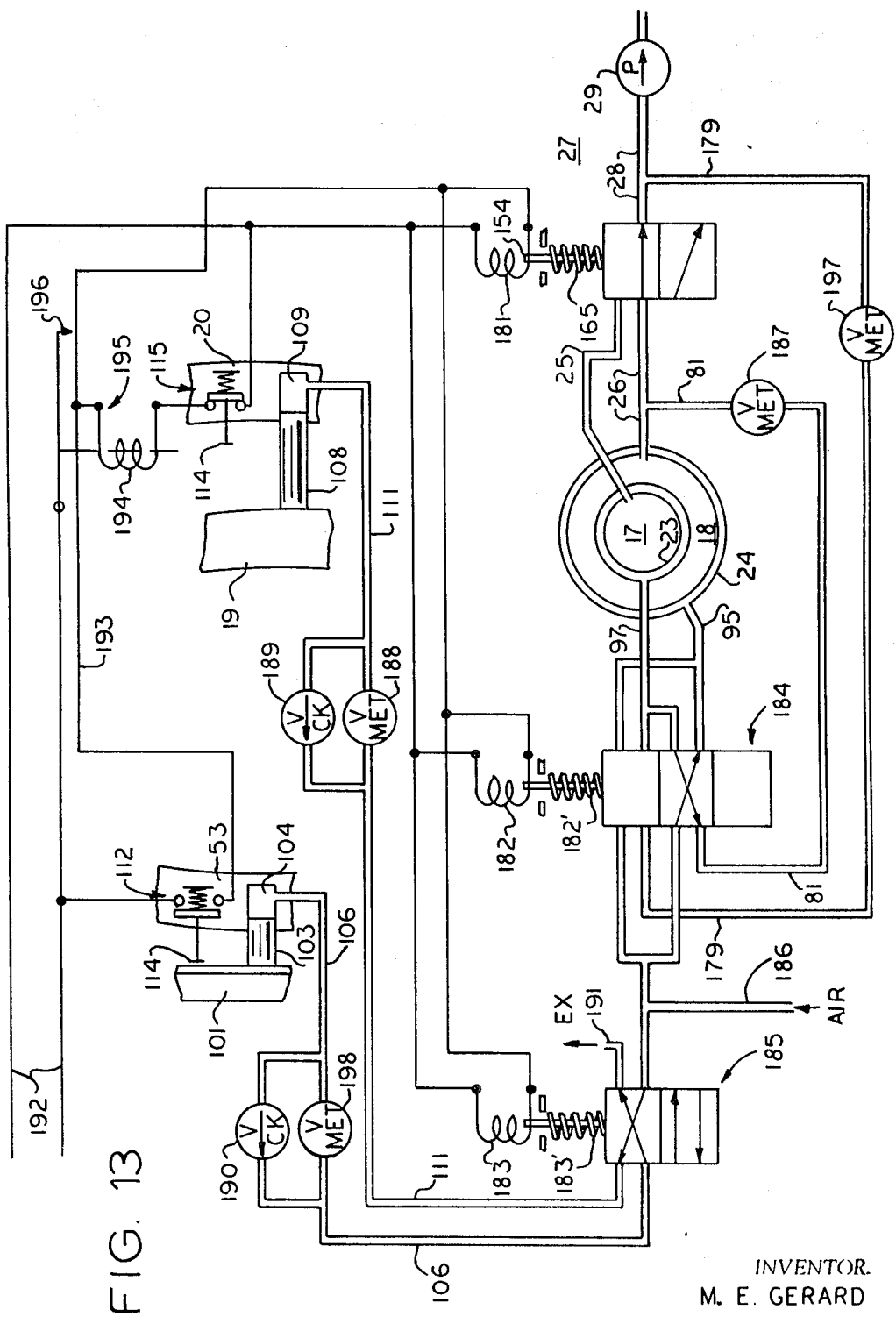

LATERALLY SLIDABLE SEALED JOINT

BACKGROUND OF THE INVENTION

This application is a division of my copending application for Sliding Vacuum Seal for Electron Beam Welder, Ser. No. 520,002, filed JA 11, 1966, now U.S. Pat. No. 3,435,185.

This invention relates generally to electron beam welders and more particularly to a new and improved method and apparatus for relatively moving an electron beam in sealed relation to a work surface upon which a welding operation is to be performed by the electron beam.

The present invention is an improvement in the walking bellows arrangement disclosed and claimed in U.S. Pat. No. 3,219,792 issued to Donald E. Pederson for "Electron Beam Vacuum Welding System with Walking Seal" and assigned to the assignee of the instant application.

The patented bellows arrangement provides for continuous and progressive welding along a workpiece disposed outside the high vacuum chamber of the electron gun. The beam is directed from the electron gun outwardly of the high vacuum chamber through a limiting orifice and thence onto the surface of the workpiece. Inner and outer vacuum cups, in the form of open ended bellows, have a common base secured to the high vacuum chamber with the cups aligned substantially concentrically with the aforementioned limiting orifice.

The open ends of the cups have resilient surfaces for sealing engagement with the surface of the workpiece in surrounding relation to the region of impingement of the beam thereon, and the walls of the bellows are flexible to thus permit movement of the ends of the cups parallel to their common base. The vacuum cups are pumped to a lower order of vacuum than that of the high vacuum of the gun chamber by a vacuum pump which is connected by separate ducts with the cups, the duct for the inner cup including a check valve to prevent loss of vacuum in the inner cup. The duct for the outer cup includes a first valve for alternately closing and opening the outer cup to the vacuum pump and a second valve which is operable when the first valve closes to inject a quantity of helium into the outer cup sufficient to reduce its vacuum to near atmospheric pressure, thereby to release the outer cup for sliding movement along the work surface. When the first valve operates to open the outer cup to the vacuum pump, the vacuum in the outer cup is increased to substantial equality with the vacuum in the inner cup, thereby to break the vacuum seal of the inner cup and release the same for sliding movement with respect to the work surface.

In the operation of the patented device, the electron beam is progressively moved relative to the surface of the workpiece with the inner and outer vacuum cups alternately disposed in sealing and sliding engagement with the workpiece. During the period in which the inner cup is sealed to the surface by reason of its vacuum therein, the outer vacuum cup, which is internally at atmospheric pressure, slides along the surface. At the end of this period, a vacuum is drawn in the outer cup and it becomes locked in sealing engagement with the surface of the workpiece by reason of its vacuum. The near equal vacuum pressures in the two cups which is then established releases the inner cup for sliding movement along the surface as the electron beam continues to move therealong. In either case, the low order of vacuum environment within the inner cup alone, or within the combined chambers of the inner and outer cups, provides a proper environment for maintenance and continuance of the electron beam as well as for welding. The injection of the helium under pressure into the outer cup chamber, moreover, serves quickly to bring the outer vacuum cup chamber to atmospheric pressure and additionally assures the presence of a protective nonoxidizing atmosphere in surrounding relation to the electron beam as it moves in welding relation over the surface of the workpiece.

SUMMARY OF THE INVENTION

In accordance with the improved walking seal arrangement of the present invention, inner and outer vacuum chambers are provided in which the outer chamber has a liquid-sealed sliding connection with the high vacuum chamber of the electron gun and the inner walking chamber has a liquid-sealed sliding connection with the outer chamber, thereby improving the walking action of the inner and outer chambers over the work surface. This improvement follows from the fact that both of the inner and outer chambers may make planar sliding movements with respect to each other and with respect to the vacuum chamber of the electron gun. The liquid seals which are mercury, or the equivalent, serve to seal the inner and outer chambers to retain the vacuum conditions therewithin while also permitting the aforesaid planar movements thereof to thus obviate the flexing movements of the bellows as required in the patented arrangement hereinabove described.

The sliding liquid seal arrangement of the present invention, moreover, has an additional advantage in that the outer chamber volume may be reduced by as much as 90 percent over that required in the bellows arrangement, thus requiring that only about 10 percent as much volume need be pumped during each cycle.

The walking seal arrangement of the present invention also features the use of inflatable pneumatic seals for the walking chambers to provide for closer timing of the sealing and release of the walking chambers as well as for the indexing movements thereof during each walking cycle. Pneumatic motors and metering means therefor are provided to index the chambers with respect to the relatively moving beam whereby the chambers are alternately positioned and sealed, as required, to continuously maintain the vacuum environment for the beam. Upon release of the chambers by deflation of their respective pneumatic seals, the same are withdrawn out of engagement with the workpiece and there is thus no loading imposed thereon by reason of such engagement when the indexing movements occur.

The present invention further features novel valve arrangements and actions to assure complete isolation between the environments of the walking chambers, that is to say, although a single pump is employed to evacuate both chambers, one of the chambers is always closed to the pump prior to opening the same to the other chamber.

The present invention further features a fully automatic walking seal system in which the valves and pneumatic seals and motors are cyclically operative to establish and maintain the required low-order vacuum environment for the beam as the same moves relative to the workpiece.

Although the liquid seals of the present invention are disclosed herein as having particular application to an electron beam welder, it will be understood that the same have other applications as where joined pipe sections require lateral displacement at their joint, or where a supply or exhaust duct connected to a chamber must have provision for lateral displacement of the same at its sealed connection with the chamber. Whatever the application of the liquid seals may be, the principle of operation is the same in each case and involves the displacement of the mercury in the sealed chamber or cavity provided between the parts. The volume of mercury and that of its enclosing chamber remains the same as the parts shift position relative to each other. The configuration of the mercury and its enclosing chamber changes, however, as the parts shift with respect to each other, the displacement of the mercury being readily accomplished as the mercury chamber decreases in volume in certain portions thereof while increasing in volume in other portions.

OBJECTS OF THE INVENTION

An object of the invention therefore is to provide new and improved sealed couplings between laterally displaceable pipe or chamber members.

Another object is to provide a new and improved method and apparatus for moving an electron beam in sealed relation to a workpiece upon which a work function is to be performed by the beam.

Another object is to provide an electron beam welder having walking chambers which alternately surround the beam in sealing engagement with the workpiece while the other of the chambers is indexed in a planar movement with respect to the work surface.

Another object is to maintain a seal between the walking chambers and with respect to the high vacuum chamber of the electron gun by the displacement of a liquid medium of constant volume.

Still another object is to releasably seal the walking chambers to the work surface by deflatable pneumatic means.

Yet another object resides in the provision of a walking chamber which may effectively be sealed to the workpiece in surrounding relation to the electron beam to establish a sufficient vacuum environment thereabout and which may be withdrawn from the work surface to thus avoid loading of the chamber by the workpiece during the indexing movement of the chamber.

Yet a further object resides in the provision of cyclically operative means for continuously moving an electron beam relative to a work surface while surrounding the beam with a vacuum environment which does not require a protective gaseous atmosphere to perform a welding operation by the beam on the workpiece.

Still other objects, features and advantages of the present invention will become more fully apparent from the following detailed description of a preferred embodiment of the invention, reference being had to the accompanying drawings wherein:

BRIEF DESCRIPTION OF THE DRAWINGS

FIG. 5 is a fragmentary sectional view of the electron beam welder;

FIG. 11 is a plan view of the vacuum control valve for the walking chambers as viewed from the underside thereof;

FIG. 12 is a sectional view of the vacuum control valve as seen along the line 12—12 of FIG. 11;

FIG. 13 is a diagrammatic view of the complete electrical, vacuum, and pneumatic systems of the present invention.

Figure 1:
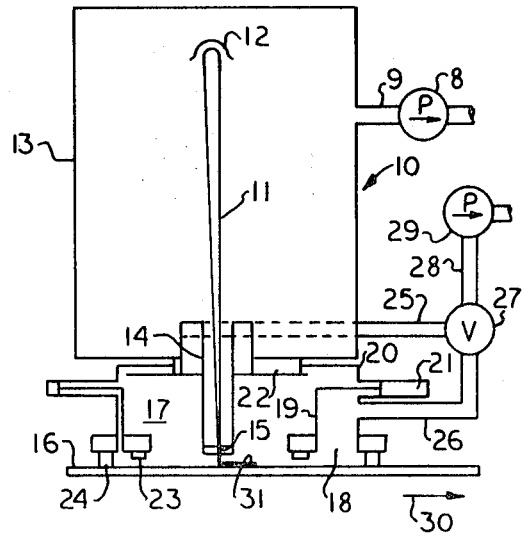
FIG. 1 is a diagrammatic view of an electron welder constructed in accordance with the principles of the present invention and disclosed in an operative relation to a workpiece.

Referring now to the drawings for a more complete understanding of the invention, and first more particularly to FIG. 1, there is shown thereon an electron beam welder generally designated 10. The electron beam is designated 11 and the electron gun for producing the beam is depicted by the emitter 12. The electron beam chamber is designated 13 and is maintained at a high vacuum of the order of $10^{14}$ mm. Hg. by a diffusion pump 8 acting through the duct 9.

The beam passes outwardly of the gun chamber 13 through a tube 14 and thence through a limiting orifice 15 in the tube to impinge upon the workpiece 16. This region of impingement of the beam with the surface of the workpiece is enclosed by inner and outer sealed chambers respectively designated 17 and 18. As will subsequently more fully appear, chambers 17 and 18 respectively are formed by walking members 19 and 20 having displaceable liquid seals 21 and 22 at their upper ends and pneumatic seals 23 and 24 at their lower ends respectively. Inner and outer chambers 17 and 18 are evacuated respectively by way of ducts 25 and 26 connected to a control valve 27, in turn, connected by way of vacuum line 28 to a roughing pump 29.

In the operation of the electron beam welder as thus far described it will be assumed that the vacuum chamber 13 has been evacuated by pump 8 to the high vacuum required for operation of the electron gun 12 and that the gun is in operation and the beam 11 is focused on the workpiece, as shown. It will be assumed further that the workpiece 16 is moving to the right in the direction of arrow 30, it being assumed that the beam 11 and its associated structure are stationary. It is to be understood, however, that whenever desirable and practical, the welder 10 and its associated pumps, valves, ducts, and other equipment may be moved with respect to the workpiece, which, in this case is fixed. In either case, the beam and workpiece move relative to each other and the walking principle is the same in both cases. It will be assumed, moreover, that roughing pump 29 is working and reducing the pressure in chamber 17 or 18, whichever the case may be, to a low order of vacuum of less than 100 microns.

Figure 4A:
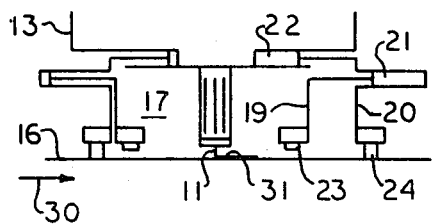
FIG. 4a–e is a diagrammatic view depicting the walking action of the electron beam welder of FIG. 1 for one complete walking cycle.

Referring now to FIGS. 4a–e, it will be seen that the showing in FIG. 4a is the same as in FIG. 1, that is to say, the walking members 19 and 20 occupy the same positions as in FIG. 1. In this position of the parts, pneumatic seal 24 is sealed and releasably locked to the work surface 16, and the pneumatic seal 23 is withdrawn or retracted upwardly and completely disengaged therefrom. The beam is stationary and the workpiece has progressively moved to the right with respect thereto, as indicated by the arrow 30, with the result that a weld 31 has been formed on the workpiece. The pneumatic seal 24 which has been locked and sealed to the workpiece during this movement, has therefore moved with it to the end of its travel, as indicated in FIG. 4a.

Figure 4B:
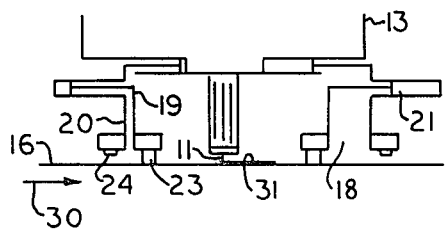

As this occurs, inner seal 23 is inflated and thus caused to move into engagement with the surface of the workpiece, and sequentially thereafter, seal 24 is deflated and withdrawn from the workpiece. Simultaneously therewith, valve 27, FIG. 1, is operated to close pump 29 to the outer chamber 18 and, sequentially thereafter, open the inner chamber 17 to the pump 29. When this occurs, the parts are in the positions as depicted in FIG. 4b. The workpiece, of course, is progressively moving all the time, and the weld 31 has become somewhat longer than as shown in FIG. 4a. The inner seal 23 now moves with the workpiece 16, and concurrently therewith, the walking member 20 and its seal 24 are indexed to the left. At the end of this indexing movement of seal 24, the parts reach the positions shown in FIG. 4c. Whereas in FIG. 4a the liquid in seals 21 and 22 is largely displaced to the right, as a result of the aforementioned movements of walking members 19 and 20, the liquid in seals 21 and 22 becomes largely displaced to the left as depicted in FIG. 4c.

Figure 4C:
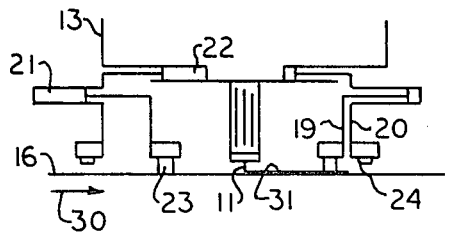
Figure 4D:
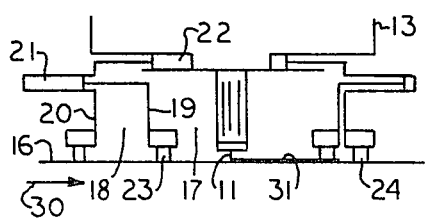

When the parts reach the positions as shown in FIG. 4c, outer pneumatic seal 24 is inflated to engage the surface of the workpiece 16 in sealed relation therewith as depicted in 4d. Simultaneously therewith, valve 27, FIG. 1, is operated to close pump 29 to the inner chamber 17 and thereafter open the same to outer chamber 18. When the pressure in outer chamber 18 is reduced to near equality with the vacuum in the inner chamber 17, the inner seal 23 is deflated whereupon the same is withdrawn from the surface of the workpiece and indexing movement of the inner walking member 19 together with its seal 23 to the left is begun. During the pumping of the outer chamber 18, both seals 23 and 24 move with the workpiece to the positions indicated in FIG. 4c wherein the inner seal 23 is disclosed in the deflated and retracted condition just described.

It will be apparent that when both seals 23 and 24 are releasably locked in sealing engagement with the surface of the workpiece, that the outer chamber 18 is that region enclosed between walking members 19 and 20 and their sealing rings 23 and 24, this chamber being sealed at its upper end by the liquid seal 21 to thus make it possible to quickly reduce the pressure in this region from atmospheric pressure to the aforementioned vacuum environment of the order of less than 100 microns. This is approximately the pressure which is maintained within the inner chamber 17 which constitutes the region enclosed by walking member 19 and including inner seal 23 at its lower end and liquid seals 21 and 22 at its upper end. Thus when the vacuum in chamber 18 is brought into near equality with that of chamber 17, seal 23 may be raised from the surface without producing any influx of air from chamber 18 into chamber 17, the presence of which could extinguish the beam 11 and/or contaminate the weld 31 being formed. When seal 23 is raised from the work surface, the evacuated chamber in which the welding is accomplished by beam 11 constitutes the combined chambers 17 and 18, and the vacuum in the combined chambers is maintained by pump 29 acting through valve 27 and duct 26.

Figure 4E:
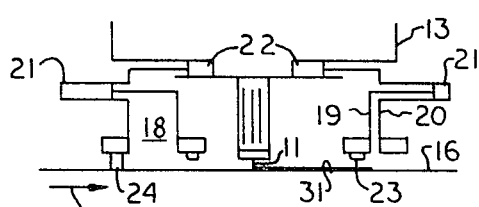

This, then, is the condition of operation as viewed in FIG. 4e. As seal 24 and its associated walking member 20 move progressively to the right with the workpiece 16 as indicated by the arrow 30, liquid seal 22 is also displaced to the right, and concurrently therewith, inner seal 23 and its associated walking member 19 are indexed to the left as liquid seal 21 is displaced to the right. As a result of these movements, these parts ultimately reach the position as depicted in FIG. 4a, thereby to complete one cycle of operations of the walking seal of the present invention.

Attention is now directed to FIGS. 5–13 which disclose a structural embodiment of the walking seal electron beam welder of FIG. 1. Reference is first directed, however, to FIGS. 2 and 3 which disclose elementary applications of the liquid seal of the present invention.

Figure 2:
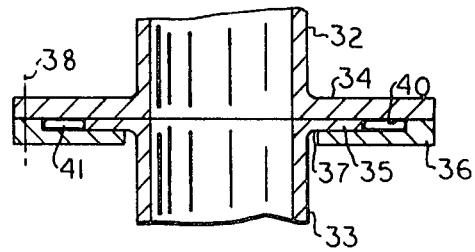
FIG. 2 is a fragmentary sectional view of two pipe sections joined by a liquid seal of the present invention.

Pipe sections 32 and 33, FIG. 2, have large and small flanges 34 and 35 respectively which are positioned in face adjacency and to end as disclosed. A washer member 36 is also disposed in face adjacency with flange 34 and has a recessed surface 37 disposed in face adjacency with the opposite flange surface of flange 35 of section 33. Washer member 36 appropriately is secured to flange 34 by suitable fasteners applied in circumferentially spaced relation along the line 38. As a result of this arrangement, a chamber 40 is formed which is enclosed by the washer member 36 and the flanges 34 and 35 of pipe sections 32 and 33. Chamber 40 is filled with a suitable liquid sealant such, for example, as mercury which, because of its molecular adhesion, displaces readily from side to side as the pipe sections 32, 33 are shifted laterally with respect to each other. When this occurs, chamber 40 and the mercury 41 filled therein maintain a constant volume which changes in configuration only as the parts shift laterally with respect to each other. The mercury, moreover, being a heavy material, is not readily displaced from the chamber 40 itself in response to differences in pressure externally and internally of the pipe sections. Thus, for example, when the pressure externally is atmospheric pressure and a vacuum is being drawn internally of the pipe sections, the mercury is not readily displaced internally by reason of such difference in pressure.

Figure 3:
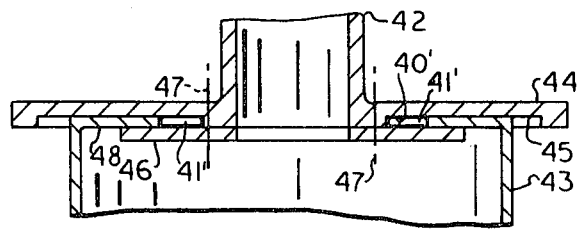
FIG. 3 is a fragmentary sectional view of a chamber and a pipe section joined together by a liquid seal of the present invention.

In FIG. 3, a pipe section 42 and a chamber 43 are similarly joined or coupled by a liquid mercury seal 41' disposed similarly within an enclosed chamber 40'. In this arrangement, the flange 44 of pipe section 42 is recessed as at 45, and a washer member 46 is secured to the flange in underlying and overlapping relation to its recess 45, the washer being suitably secured to the flange by fasteners disposed circumferentially in spaced relation along the lines 47. The flange 48 of chamber 43 is disposed within the recess 45 in flange 44 and extends slidably between the flange and its superposed washer member 46 thereby to form the chamber 40' which is thus enclosed by flange 44, washer member 46, and flange 48.

Mercury 41' thus disposed within chamber 40' provides a flexible coupling between pipe section 42 and chamber 43 to permit lateral displacement between the same while maintaining a fluid-sealed joint therebetween. Thus, for example, pipe section 42 may be a vacuum line from a vacuum pump for the purpose of establishing a high vacuum within the chamber 43 and, notwithstanding the fluidtight conditions required for such purpose, duct 42 and chamber 43 may be shifted laterally readily with respect to each other without impairing the effectiveness of the fluidtight connection afforded thereby. This arrangement is ideally suited for the purpose of the walking chambers of the present invention, as will presently appear.

Referring now directly to FIGS. 5–10, the electron gun is generally designated 51 and is depicted by the dashed lines in FIG. 5. The gun and associated apparatus may be of any type suitable for the purpose such, for example, as Sciaky-type specification No. 7185, with modified rating of 15 kw., 500 ma. power supply, 30 kv. gun, and associated components. The electron gun chamber 13 is preferably formed of steel in upper and lower separable parts generally as disclosed in the aforementioned U.S. Pat. No. 3,219,792 issued to D. E. Pederson.

For purposes of the present invention, the lower part of the vacuum chamber 13 comprises an integrally formed bottom portion 52 against which the electron gun 51 may be seated. Bottom 52 has a depending hub portion 53 having a central bore 54 within which the beam tube 14 is mounted, bore 54 being reduced as at 55 for threaded engagement with a threaded portion of the tube. The opening through tube 14 is thus aligned with the electron gun 51 for passage of the electron beam therethrough. Orifice 15 is formed as by burning the beam through a suitable member 56, FIG. 6, which is secured and sealed to beam tube 14 as by the open-ended cap 57, FIGS. 5 and 6.

Central bore 54 is enlarged as at 58 and communicates with a radially directed opening 59 which is elongated in cross section. Opening 59 extends outwardly of hub 53 where it makes communication with duct 25 which has a mounting flange 61 best seen in FIG. 7, for securing the same as by fasteners 62 to the hub 53. A vacuum may thus be drawn within the inner chamber 17 through vacuum line 25 in communication with openings 59 and 58 which lead to the inner chamber.

Hub 53 has a reduced hub portion 63 to which a washer shaped member 64 is secured as by circumferentially spaced fasteners 65. Washer member 64 extends diametrically in underlying spaced relation to the end face surface 66 of hub 53 thereby to form an annular chamber or cavity 40" in which the flange portion 67 of walking member 20 extends slidably. Hub portion 63 and surface 66 of hub 53 together with washer member 64 and flange 67 of member 20 thus form chamber 40" therebetween. Chamber 40" is filled with a quantity of mercury designated 41" to thus provide the liquid seal 22 for walking movement of the member 20.

Member 20 comprises a short cylindrical wall or ring 68 having the aforementioned internal flange 67 and having also an external flange 69. Secured to flange 69 is a washer-shaped ring member 71, the same being secured together as by suitable screw fasteners 72 which are disposed circumferentially in spaced relation to these members as may best be seen in FIG. 8. The upper surface of ring member 71 is recessed as at 73 to provide a cavity for slidably receiving flange 74 on cylindrical wall portion 80 of walking member 19. The arrangement is thus such that a chamber 40''' of constant volume and changing configuration is formed and enclosed by flange 69 and washer member 71 of outer walking member 20 in sliding cooperation with flange 74 of inner walking member 19. This chamber or cavity is filled with a quantity of mercury 41''' to thus provide the liquid seal generally designated 21 for the inner walking member.

Figure 6:
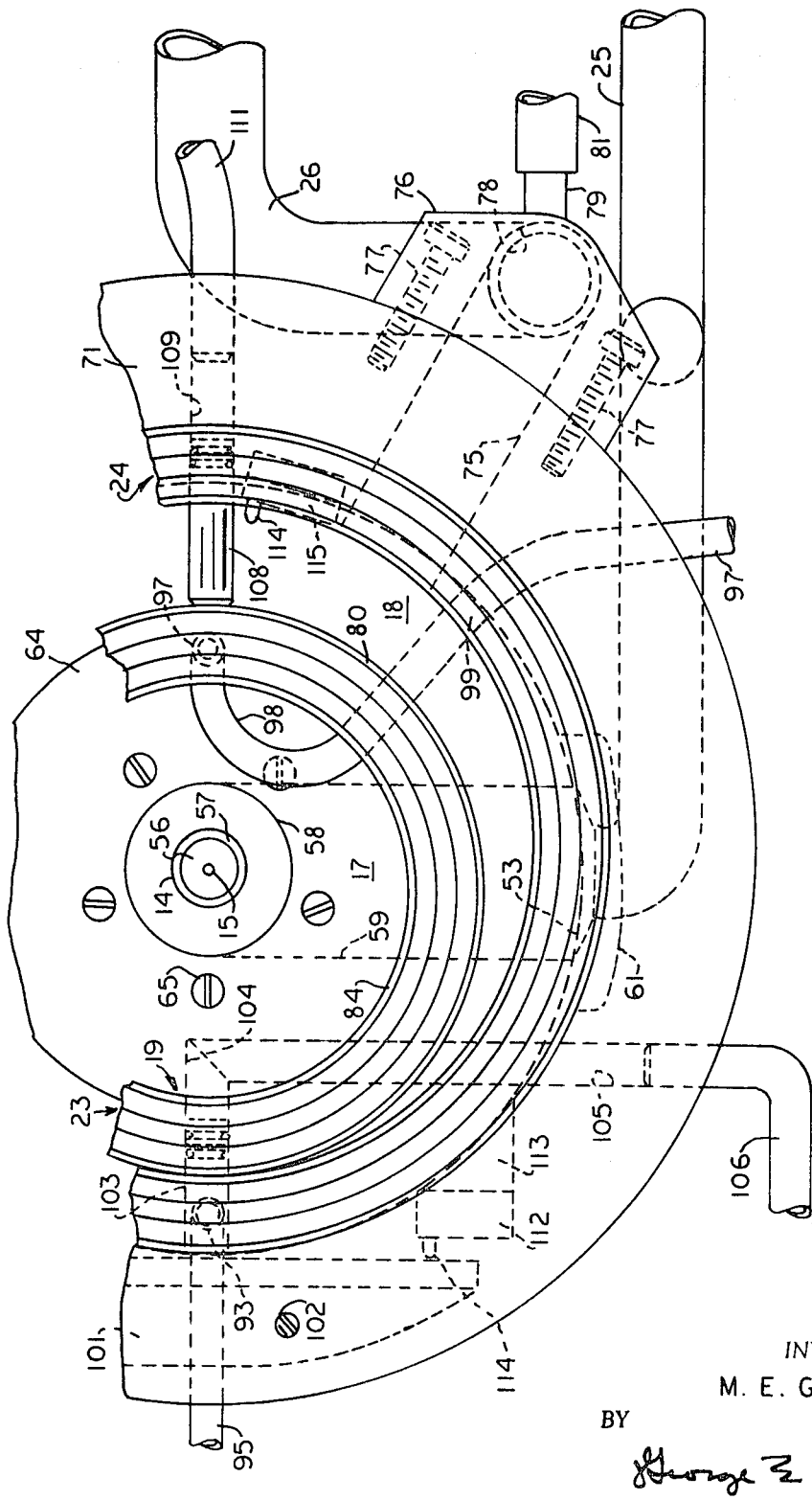
FIG. 6 is a fragmentary bottom view of the electron beam welder as viewed along the line 6—6 of FIG. 5.
Figure 8:
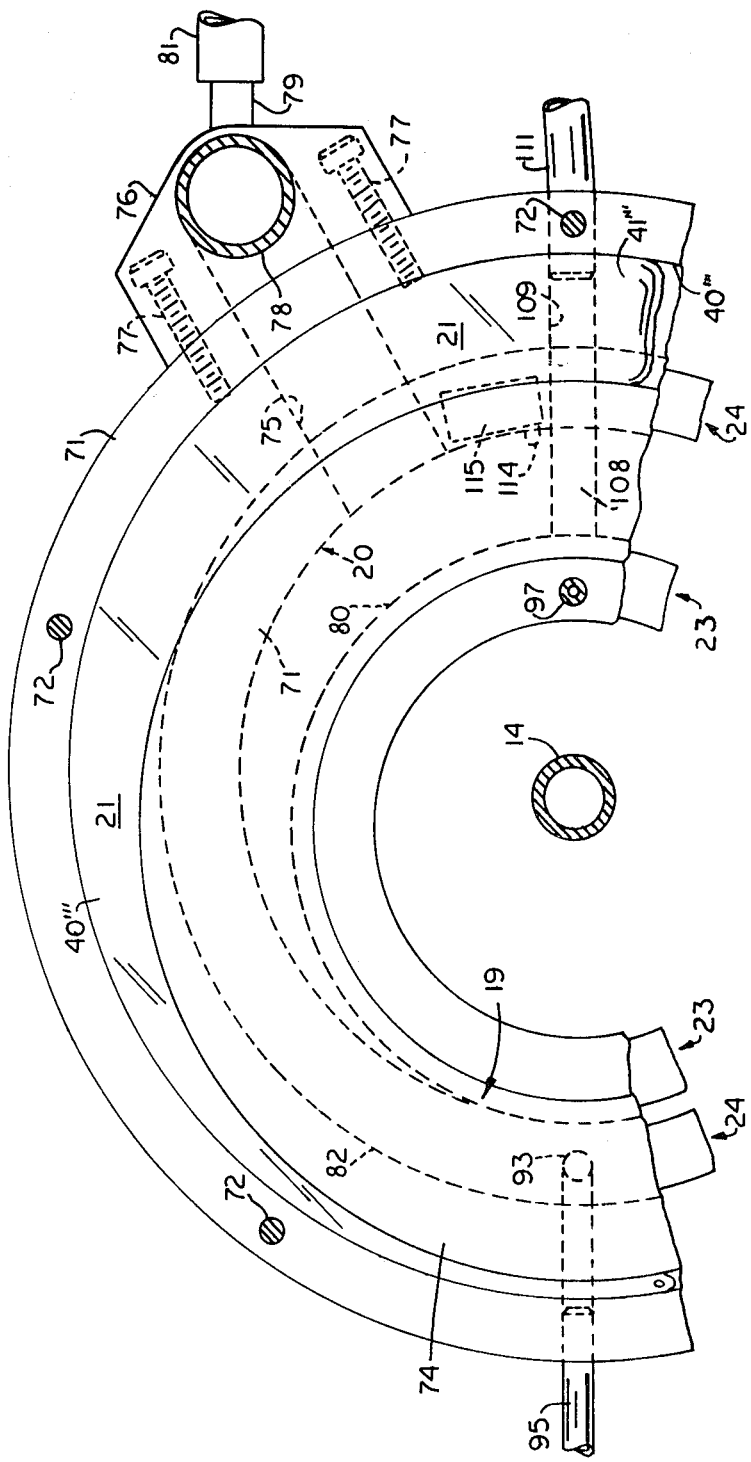

Ring member 71 has a radially extending opening 75, FIGS. 6 and 8, which communicates with a connector 76 for vacuum supply line 26, the connector being secured to the member 71 as by suitable fasteners 77. Connector 76 has a nipple 78 to which the flexible line 26 makes connection, the latter being yieldably slipped onto the nipple. The connector has a second nipple 79 to which a flexible line 81 is similarly secured for a purpose subsequently to be described. As may best be seen in FIG. 6, vacuum line 26 and opening 75 thus lead to the outer vacuum chamber 18. Vacuum line 25 and opening 59 and 58 therefrom, on the other hand, lead to the inner vacuum chamber 17.

Figure 9:
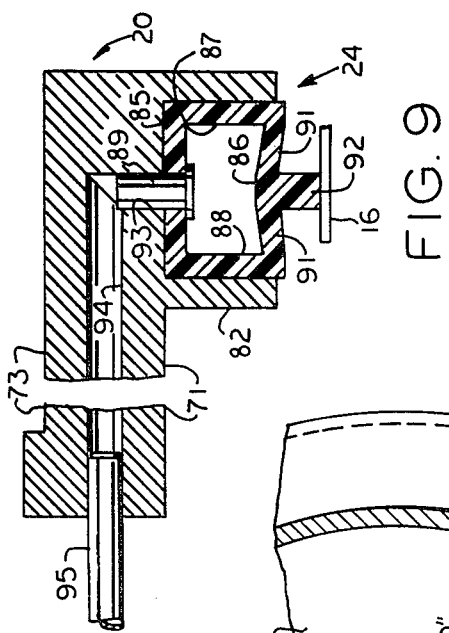
FIGS. 9 and 10 respectively are fragmentary views, somewhat enlarged, of the outer and inner seal assemblies disclosed in FIG. 5.
Figure 10:
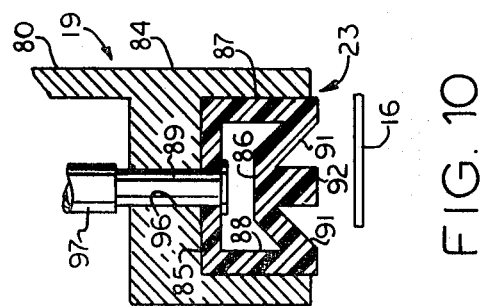

Ring member 71 has a depending, open-ended annular flange 82 within which is seated a resilient inflatable seal generally designated 24 in FIGS. 5, 6 and 8, this being the outer pneumatic seal referred to in FIGS. 1 and 4. Similarly, inner walking ring member 19 has a depending open-ended annular flange 84 in which is seated a resilient inflatable seal which is generally designated 23 in FIGS. 5, 6 and 8, this being the inner pneumatic seal referred to in FIGS. 1 and 4. Inflatable seals 23 and 24 may be of any type suitable for the purpose such, for example, as BFG Inflatable Seals, type No. C manufactured by B. F. Goodrich Company which are formed of Nomex Reinforced Silicone, or the equivalent. The cross-sectional configuration of these seals is best seen in FIGS. 9 and 10 to which figures reference is now directed.

It will be understood that seals 23 and 24 are generally of the same construction, differing only in respect to their diameters. The sealing rings are generally of hollow rectangular cross section, comprising upper and lower annular walls 85 and 86 and integrally formed inner and outer sidewalls 87 and 88. Air supply nipple 89 is suitably secured to the upper wall 85 in airtight relation thereto. Bottom wall 86 has depending portions 91 which extend upwardly from the sidewalls 87 and 88 to a depending annular nub portion 92 which, in the inflated condition of seal 24 as disclosed in FIGS. 1, 4a, 4d, 5 and 9, is extended into engagement with the surface of the workpiece 16, FIG. 1. The depending wall portions 91 are so designed as to provide ease of extension of the nub 92, as aforementioned, upon inflation of the seal and also to provide for ease of withdrawal, or retraction of the same into the region enclosed by walls 85, 87 and 88 of the seal upon deflation of the same as depicted in FIG. 4b and 4c wherein nub 92 is disposed above the surface of the workpiece 16. This retracted seal position is best disclosed in FIGS. 5 and 10 wherein seal 23 appears in detail.

Referring again to FIG. 9, nipple 89 on resilient seal 24 extends into an opening 93 therefor provided in ring member 71, and opening 93 communicates with an opening 94 which extends radially outwardly of ring 71 to receive thereinto a flexible pneumatic line 95. Nipple 89 for resilient seal 23, FIG. 10, extends through an opening 96 provided therefor in flange 84 of walking member 19, and a flexible line 97 is yieldably slipped over nipple 89 to thus form an airtight connection therewith.

Referring now to FIGS. 5 and 6, it will be seen that pneumatic line 97 has a semicircular loop portion 98 sufficient to permit flexing of the pneumatic line in response to walking movement of inner walking member 19, the tube being more or less fixed as within exit opening 99 provided therefor in the cylindrical wall 68 of walking beam member 20. Tube 97 thus leaves the inner vacuum chamber 17 by way of the opening 99 with which the flexible line forms a vacuumtight interfit.

Figure 7:
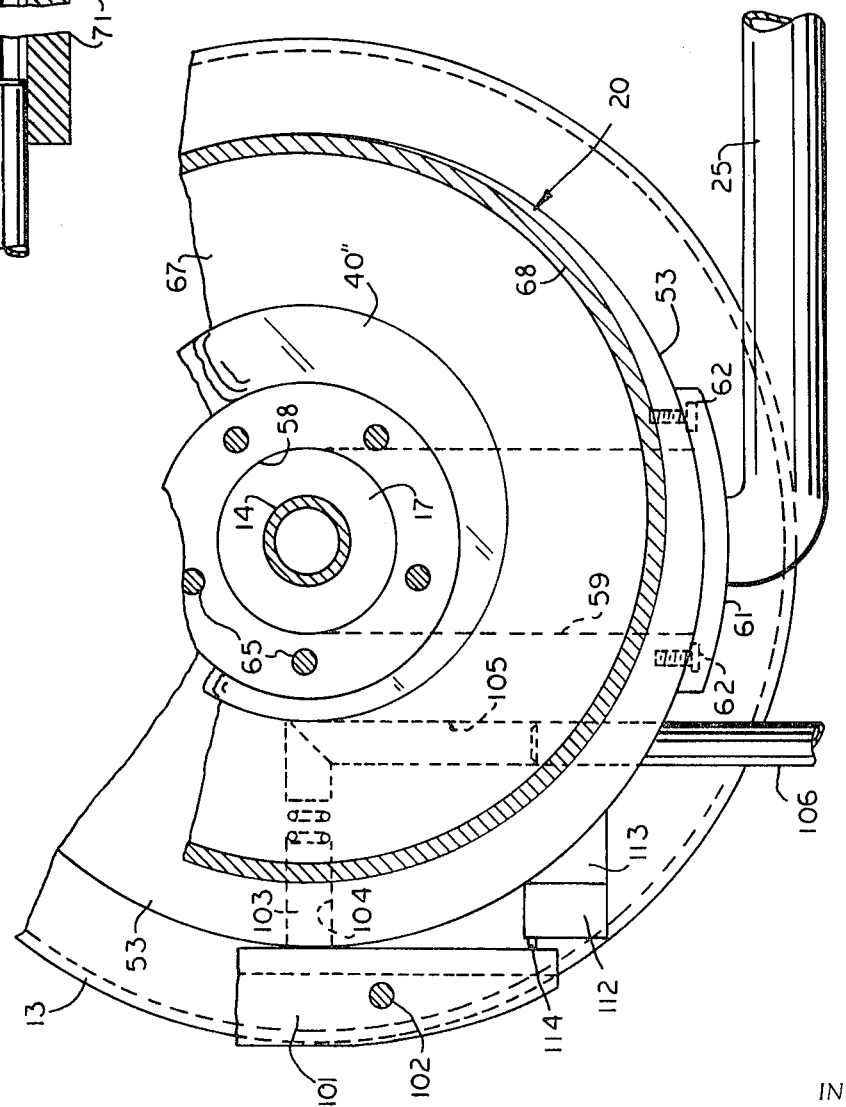
FIGS. 7 and 8 are sectional views taken along the lines 7—7 and 8—8 respectively of FIG. 5.

An angle bracket 101, FIGS. 5 to 7, is secured as by suitable fasteners 102 to flange 69 of walking member 20. Member 20 is moved or indexed by a piston 103, the end of which bears against the upstanding portion of angle bracket 101 as best seen in FIG. 5. Piston 103 is slidably mounted in a bore 104 disposed radially within the hub portion 53 of vacuum chamber 13. Bore 104 communicates with a traverse bore 105 which extends outwardly of the hub 53 as best seen in FIG. 6. A flexible line 106 is disposed within bore 105 in airtight relation therewith to thus provide for the supply of air under pressure via line 106, bore 105 and thence by way of bore 104 to the head of the piston, the piston having O-rings 107, FIG. 5, which serve as piston rings to prevent leakage of the air under pressure.

Walking member 19 is indexed by a piston 108 which bears against the outer annular surface of wall portion 80 of walking ring member 19. Piston 108, which is somewhat longer than piston 103 for a purpose subsequently to be explained, is slidably mounted within a bore 109 provided therefor in ring member 71, bore 109 extending radially through the member as best seen in FIGS. 5 and 6. A flexible pneumatic line 111 is inserted into bore 109 in airtight relation therewith and thus provides for the supply of air under pressure via line 111, and thence by way of bore 109 to the head of piston 108 which similarly has O-ring type piston rings 107.

As best seen in FIG. 7, a normally open microswitch 112 is suitably secured as by a bracket 113 to the hub 53 of vacuum chamber 13. Switch 112 has an actuating button 114 which is engaged by bracket 101 to close the switch when the outer walking member 20 is in the position depicted in FIGS. 5 to 7.

A second normally closed microswitch 115, FIGS. 6 and 8, is suitably secured to ring member 71 of outer walking member 20, being disposed within a recess provided therefor in member 71 adjacent to bore 109 for piston 108, FIG. 6. Actuating button 114 of switch 115 is thus similarly positioned for engagement with cylindrical wall 80 of walking member 19 when the same has been moved, as from the position in FIG. 5, to back piston 108 entirely within its bore 109. When switch 115 is thus actuated, its switch contacts are opened, the same being normally closed as aforementioned.

Reference is now directed to FIGS. 11 and 12 for a more detailed description of valve 27 heretofore referred to in connection with the description of the schematic showing of FIG. 1. Valve 27 is generally designated in FIG. 12 and comprises a centrally disposed member 121 and upper and lower end plug members 122 and 123 respectively. These members are of generally square configuration, and the end plugs are secured to the center member 121 as by suitable fasteners disposed perimetrically along the lines 124 and 125, the fasteners for lower end plug 123 being depicted at 126 in FIG. 11.

Center member 121 has an upper bore 127 into which the hub 128 of plug 122 is received interfittingly. Similarly, the lower end of center member 121 has a bore 129 into which the hub 131 of lower plug 123 is received interfittingly, bores 127 and 129 being separated by a reduced diameter portion 132 of the center member. This reduced diameter portion defines a central chamber 133 which is in fluid communication with vacuum line 28 from roughing pump 29, FIG. 1. Line 28 terminates at valve 27 in a mounting flange 134 which is suitably secured to center member 121 as by fasteners disposed at the points 135. Flange 134 has a central opening 136 which is suitably shaped to merge with opening 137 provided in center member 121 to thus extend the vacuum lines from duct 28 into inner chamber 133. Opening 137 is elongated in cross section, having a narrow dimension as viewed in FIG. 12 and a wide dimension as viewed in FIG. 11.

A second similarly elongated opening or port 138 in center member 121 leads from bore 129 therein in alignment with an opening 139 provided in a mounting flange 141 for nipple 142, opening 139 being suitably enlarged and rounded as at 140 to seat the nipple interfittingly therewith and the mounting flange being suitably secured to center member 121 as by fasteners disposed at the points 143. Flexible line 26 is yieldably urged upon nipple 142 to thus provide a fluidtight connection therewith.

A third similarly elongated opening or port 144 is provided in center member 121, and this port leads from bore 127 therein to an opening 145, FIG. 11, provided in a mounting flange 146 for vacuum line 25, opening 145 being suitably shaped to merge with the inner wall of duct 25 and flange 146 being suitably secured to member 121 as by fasteners disposed at the points 147.

A valve member 148 having O-rings 149 and 150 is disposed for sliding movement within bore 129 of center member 121, valve member 148 being of appropriate axial length so as to clear the port 138 when disposed within the position as disclosed in FIG. 12 wherein member 148 is bottomed on the hub 131 of end plug member 123. O-ring 149 wipes along the bore 129 to thus seal the vacuum condition extending from pump line 28 through the valve to outer walking chamber line 26. O-ring 150 which is disposed within the upper end face of valve member 148 is arranged to engage the lower shoulder surface 151 of central member 121 when valve 148 is moved upwardly to close off port 138 and thus shut off the outer chamber from communication with roughing pump 29 by way of vacuum line 28 through the valve 27. Valve 148 is urged into this shutoff position by means of coil spring 152 which is seated in a bore 153 provided in end plug 123 such that spring 152 thus bears against the lower end face of valve 148 to urge the same upwardly.

Valve member 148, however, is normally retained in the opened position disclosed in FIG. 12 by means of a plunger 154 having a lower end portion 155 which is slidably received in a central opening 156 provided in valve member 148, plunger member 155 having a suitable O-ring 157 for sealing the sliding connection therebetween. Plunger 154 has an enlarged diameter portion 158 which engages valve member 148 as at 159 to force the valve member against the opposing force of spring 152. To this end, plunger 154 has a reduced diameter upper portion 161 which is slidably received within a bore 162 provided therefor within the external hub portion 163 of upper end plug member 122. Opening 162 is enlarged as at 164 to slidably receive shaft portion 160 of plunger 154, this portion of the plunger conforming in diameter generally to lower portion 155 and similarly has an O-ring 157 to seal the sliding connection with end plug 122. A coil spring 165 is interposed between the resulting shoulders 167 and 168 on the end hub 163 and plunger shaft portion 160, respectively. Coil spring 165 is designed to exert a greater spring force than spring 152 with the result that valve member 148 is normally urged into the opened position of port 138, as disclosed.

A second valve member 171 is a slidably disposed within bore 127 of the center member 121 and is provided with an O-ring 172 which seats against the upper shoulder 173 of the center member 121. In this position, valve member 171 serves to close port 144 off from chamber 133 whereby the inner walking chamber 17 is blocked by the valve from vacuum line 28. Member 171 is held in this port closing position by means of a coil spring 174 which bears at one end against the valve member and at the other end against a shoulder 175 in end plug member 122 which is formed as a result of the enlargement as at 176 of bore 164. Member 171 has a central opening 180 and is thereby freely slidably mounted with respect to plunger shaft 160, this sliding connection being sealed by a third O-ring 157.

With the parts of valve 27 positioned as disclosed in FIG. 12, vacuum line 28 is opened through the valve to walking chamber line 26. Walking chamber line 25, however, is closed to vacuum line 28, being cut off therefrom by valve member 171 in sealing engagement with member 121 by the O-ring 172 in engagement with the shoulder 173. When the winding for plunger shaft 161 is energized, the plunger is moved axially upward, and this movement is followed by upward movement of valve member 148 under power of spring 152, member 148 ultimately moving to engage O-ring 150 with shoulder 151 of center member 121, thereby to cut off walking chamber line 26 from vacuum line 28. Upon further upward movement of the plunger, enlarged shaft portion 158 thereof engages hub portion 177 of valve member 171 to thus raise the same and break the sealed engagement of its O-ring 172 with the shoulder surface 173 of center member 121. Continued upward movement of plunger 154 continues to move valve member 171 against the opposing spring force of spring 174 until the valve member bottoms against the end face of hub 128 of end plug 122. During this movement of valve member 171, port 144 becomes fully opened to chamber 133 and, hence, vacuum communication is established between vacuum line 28 and vacuum line 25 for the inner walking chamber 17.

In the aforedescribed operation of valve 27 by solenoid action on its plunger 154, the upward movement of the plunger is aided by spring 152 until valve member 148 becomes seated to close port 138, the plunger being opposed during this movement by coil spring 165. When the plunger engages valve member 171 to move the same, coil spring 174 further opposes the solenoid-induced motion of the plunger. It is to be significantly noted, moreover, that in the valve action described, port 138 is fully closed before opening of valve port 144 is begun. This assures that there will be no loss of vacuum between the walking chambers by way of the valve itself.

When the actuating winding for plunger 154 is deenergized, plunger 154 is urged downwardly, as viewed in FIG. 12, under the spring force of spring 165, and valve member 171 in engagement with enlarged plunger shaft portion 158 follows this movement downwardly under the spring force of spring 174 until valve member 171 becomes again seated with its O-ring 172 disposed in sealing engagement with shoulder 173 of center member 121. When the enlarged shaft portion 158 of plunger 154 engages valve member 148, the same is moved downwardly against the opposing force of coil spring 152 until valve member 148 bottoms on the end face of hub 131 of plug 123. As valve member 148 moves away from shoulder 151 of center member 121, port 138 again becomes opened to reestablish communication between vacuum lines 28 and 26.

In the aforedescribed operation of solenoid valve 27 in its deenergized state, it is significant to note that the return movement of plunger 154 is under power of its coil spring 165, and that valve member 171 is returned only under power of its coil spring 174. Plunger 154, however, under power of its return spring 165 must reseat valve member 148 against the opposing force of its coil spring 152. By reason of this arrangement, valve member 171 is closed upon seating engagement of its O-ring 172 on shoulder 173 of center member 121 to thus close port 144 before opening of port 138 is begun, thereby assuring that there will be no loss of the vacuum from the inner chamber 17 by way of valve 27 to the outer chamber 18 when the valve is operated by spring force to open the outer walking chamber to vacuum line 28.

Line 28 has an exit nipple 178 upon which a flexible tube 179 is yieldably urged in vacuum-sealing relation thereon for a purpose hereinafter to be disclosed.

A complete walking cycle of operations of the heretofore disclosed apparatus will now be described with particular reference to FIGS. 1, 4, 13 and 14, it being assume that the parts are in the positions best depicted in FIGS. 1, 4a, 5 and 12 and that the operating conditions prevail as heretofore described in connection with the description of those figures. Thus, actuating winding 181, FIG. 13, for valve 27 is disclosed in its deenergized state and, as such, inner chamber 17 and its line 25 are blocked by valve 27 from vacuum line 28. Outer chamber 18, however, and its line 26 are connected through the valve with line 28.

Actuating windings 182 and 183 for solenoid valves 184 and 185, respectively, are also in their deenergized state, and the valves are yieldably positioned by their return springs 182' and 183', respectively, such that air under pressure from a suitable source (not shown) is supplied by way of air supply line 186 through valve 184 and thence by way of air line 95 to outer pneumatic seal 24, the same therefore being inflated and sealed to surface 16, FIG. 1. Inner pneumatic seal 23, on the other hand, is connected by way of its line 97, valve 184, and vacuum line 81 to vacuum line 26 at its point of entry, FIG. 8, to outer chamber 18, there being a metering valve 187 in line 81 for a purpose subsequently to appear. Seal 23 and chambers 17 and 18 are thus all approximately at the same level of pressure of less than 100 microns wherefore seal 23 is deflated and retracted from the surface of workpiece 16, FIG. 1.

Air pressure from supply line 186 also passes through valve 185 and thence by way of air line 111 to the head of piston 108 wherefore the same has been extended thereby to the position best seen in FIG. 5 wherein the inner walking member 19 and its seal 23 are disclosed as having been indexed to the limit of their movement to the left, it being recalled that the work movement and buildup 31 of the weld on the work is progressively to the right, as viewed in the appropriate figures. A metering valve 188 is disposed in line 111 to control the speed at which this indexing movement is accomplished and to prevent vibration of the system such as might adversely affect the electron beam welding. A check valve 189 is connected across the metering valve for a purpose later to appear.

Valve 185 exhausts to atmosphere by way of line 191 and, in its deenergized position, air line 106 from bore 104 for piston 103 is connected thereto wherefore air at the head of the piston has been expelled and exhausted to the atmosphere via line 106, check valve 190 therein, and thence by way of valve 185 and line 191, this having occurred as piston 103 moved inwardly into bore 104 to the end limit position best shown in FIG. 5. Just prior to reaching this position, microswitch 112 is actuated by its button 114 in engagement with angle bracket 101 to start a new walking cycle of operations as depicted in FIG. 4a-e. This also is the point of zero time reference in the timing chart of FIG. 14 which by the length of the lines disclosed therein, depicts the time of actuation and the extent of movement of cardinal parts of the herein disclosed welding system for one walking cycle of operations thereof.

Figure 14:
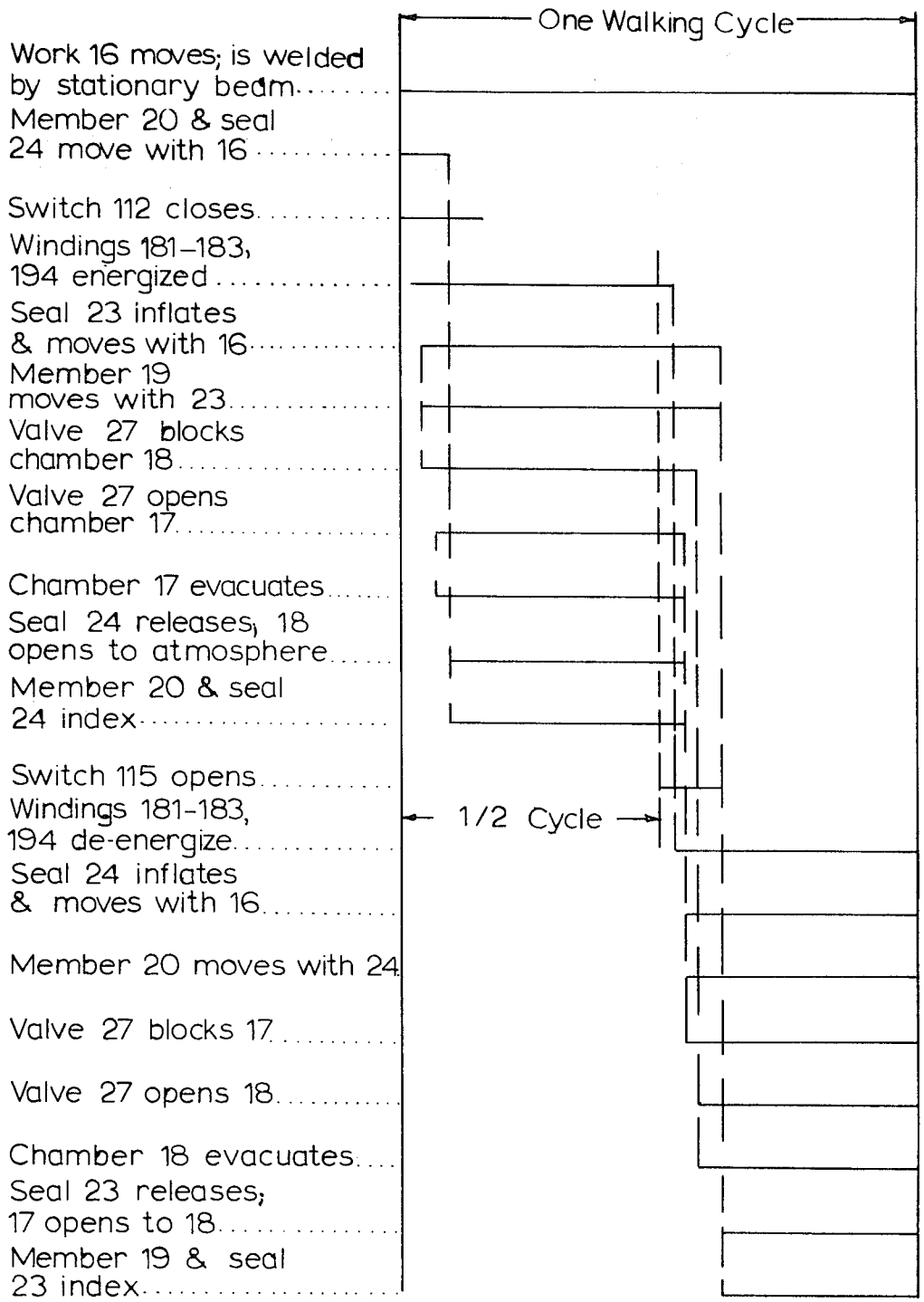
FIG. 14 is a timing chart depicting the sequence of operation of the parts during a complete walking cycle of the electron beam welder of the present invention.

The cycle, then, for example, begins as switch 112, FIGS. 13 and 14, closes. When this occurs, a suitable voltage source (not shown) applied across line 192 energizes solenoid windings 181, 182 and 183, the circuit being completed thereto by way of conductor 193 and the now closed contacts of switch 112. Winding 194 of holding relay 195 is also energized from line 192 through switch 112 and conductor 193, the circuit being completed from the other side of the winding to line 192 by way of the normally closed contacts of switch 115. As relay 195 operates, its normally open contacts 196 become closed to thus assure continued energization of solenoid windings 181-183 as long as the contacts of switch 115 remain closed.

Solenoid valves 184 and 185 are fast acting and, accordingly, upon energization of winding 182 of valve 184, air pressure from line 186 is applied through the valve and line 97 to inflate inner seal 23 and releasably lock the same to the surface of workpiece 16. This seals inner chamber 17 to the workpiece and causes seal 23 and its walking member 19 to move with the work.

Actuated valve 184 also connects outer seal 24 and its line 95 to vacuum line 179 which, it will be recalled, extends to vacuum line 28 at its input to vacuum valve 27, FIG. 12. Thus, seal 24 may be deflated quickly and retracted from the work surface and thus freed therefrom for indexing movement of walking member 20. Release of seal 24 is delayed, however, by appropriate adjustment of metering valve 197 in line 179 to assure that inner seal 23 has first become sealed to the workpiece, and to assure further that outer chamber 18 has become shut off from vacuum line 28 before seal 24 opens the same to the atmosphere.

Upon energization of winding 181 of valve 27, chamber 18 becomes closed or blocked by the valve from vacuum line 28 and, after outer chamber 18 is thus blocked, inner chamber 17 is opened by the valve to the vacuum line 28 and evacuation therefrom is begun, all this occurring, as aforementioned before seal 24 releases.

Valve 185 became actuated upon energization of its winding 183, and as thus actuated, air pressure from line 186 was applied through the valve and by way of line 106 and bore 104 to the head of piston 103. Thus, when seal 24 becomes released and retracted from locking engagement with workpiece 16, member 20 is freed for indexing movement, and air pressure on piston 103 is now able to move the same in driving engagement with angle bracket 101 whereupon walking member 20 and its seal 24 are indexed to the left, a metering valve 198 being disposed in line 106 across check valve 190 therein to slow down the indexing movement and thus avoid undesired vibration, or chattering, of the welding system, as aforementioned.

Both seals 23 and 24 move with the work prior to the release of the latter therefrom, and there is no movement of piston 108 in its bore 109 by reason of the engagement of the piston by walking member 19 as depicted in FIG. 5. When seal 24 becomes released and is indexed to the left by piston 103, however, members 19 and 20, in the region of piston 108, move toward each other, 19 moving to the right with the work 16 and 20 moving to the left with respect to beam chamber 13. As piston 108 now moves in bore 109, air is freely expelled therefrom by way of check valve 189 in line 111 and thence through valve 185 and line 191 to the atmosphere.

Since bore 109 is disposed within member 20 and thus moves therewith, bore 109 now moves with respect to its piston 108 as the member 20 indexes to the left, and further, since piston 108 is also moved into bore 109 by member 19 as the same moves with the work, piston 108 necessarily must be twice as long as piston 103 which moves only with respect to the stationary bore 104 formed in the stationary high vacuum chamber 13.

Piston 103 is required to move in bore 104 only to the extent necessary for displacement of member 20 and seal 24 with respect to the fixed beam 11, this being the distance that bore 109 in member 20 is moved with respect to piston 108. Piston 108, however, is also moved into bore 109 by the advance of member 19 with the work 16, and the accounts for the difference in length of the pistons. As otherwise expressed, when the outer seal has advanced with the work and is ahead of the beam, the inner seal will have been indexed toward the beam by the same distance so as to be in position to begin its advance with the work. The two walking chambers are thus separated at that time and in the region of piston 108 by twice the indexing distance of either of the chambers relative to the beam 11.

As walking member 20 indexes to the left, switch 112 opens as depicted by its terminated timing line in FIG. 14. As walking members 19 and 20 move together in the region of piston 108 and microswitch 115 which are carried by member 20, member 19 engages actuating button 114 for switch 115 whereupon the normally closed contacts thereof are opened to deenergize valve windings 181-183 and relay winding 194.

Upon deenergization of winding 182 of valve 184, the valve is moved by its spring 182' to the position shown in FIG. 13 whereupon air pressure from line 186 is applied via valve 184 and line 95 to inflate seal 24 whereby the same engages the work and moves therewith together with its walking member 20. As member 20 thus moves, bracket 101 carried thereby moves piston 103 into bore 104 and the air therein freely escapes by way of check valve 190 and line 106 through valve 185, now deenergized, and thence by way of line 191 to the atmosphere.

Valve 184 in its deenergized state also connects seal 23 and its line 97 to line 81 whereby seal 23 is connected for evacuation by way of metering valve 187 therein when outer chamber line 26 becomes connected through valve 27 to vacuum line 28.

Upon deenergization of winding 181 for valve 27, the same is actuated by its spring 165 to the position disclosed in FIG. 13, the inner chamber 17 and its line 25 being first blocked by the valve from vacuum line 28 before the outer chamber 18 and its line 26 are connected thereto by the valve. When chamber 18 becomes so connected, evacuation of the chamber begins by way of its line 26, and evacuation of seal 23 likewise begins preparatory to deflating the same for release and retraction from the workpiece. To insure that the seal 23 will not release chamber 17 to the environment of chamber 18 until its pressure approximates that of chamber 17, metering valve 187 is adjusted to delay the reduction of the pressure in seal 23 to this level until chamber 18 reaches the same, or shortly thereafter.

When seal 23 releases, chamber 17 is opened to chamber 18 and member 19 and its seal 23 are freed for indexing movement to the left under power of air pressure on piston 108, the air pressure being supplied from line 186 by way of valve 185, now deenergized, and thence by way of line 111 and metering valve 188 therein to bore 109. As this indexing movement begins, member 19 draws away from actuating button 114 for switch 115 whereupon its contacts are again closed as depicted by its terminated timing line in FIG. 14.

The indexing movement of member 19 is appropriately slowed by metering valve 188 therein such that member 19 reaches its position, as depicted in FIG. 5, just prior to, or concurrently with member 20 as it reaches its position depicted therein, this being the position in which switch 112 is actuated to thus start another walking cycle, the cycles being repeated as many times as required to complete the welding operation in the direction of arrow 30, FIG. 1.

From the foregoing it should now be apparent that a new and improved walking method and system for an electron beam welder has been provided which is well adapted to fulfill the aforestated objects of the invention and while a preferred embodiment of this invention has been disclosed herein, other embodiments and modifications thereof are feasible to afford the full utility and results of which the present invention is capable. For example, in lieu of the pneumatic seals herein disclosed, the vacuum cups of the aforementioned Pederson patent may be used together with the gas injection means therein disclosed to break the seal of the outer cup, the liquid seals and indexing motors otherwise being employed as herein disclosed.

It will be understood therefore that these and other examples, embodiments, and modifications of the invention may suggest themselves to those skilled in the art to which the invention most nearly appertains without departing from the scope of the invention as defined in the appended claims.

What is claimed and desired to be secured by Letters Patent of the United States is:

1. A laterally slidable sealed joint comprising a pair of hollow members having rigid flat confronting flanges positioned in face adjacency, means including said flanges and forming a closed cavity therebetween of constant volume and changing configuration as said members are shifted laterally one upon the other, and a quantity of molecularly adhesive liquid disposed within said cavity and filling the same in contact with the walls of the cavity.

2. A slidable sealed joint as in claim 1, said liquid being mercury.

3. A method of sealing a laterally slidable pair of hollow members comprising the steps of providing rigid flat confronting flanges thereon forming a closed cavity therebetween, and filling said cavity with a quantity of a molecularly adhesive liquid in contact with the walls of the cavity whereby the volume is maintained constant and the liquid is displaced from one side to the other as the members are shifted laterally with respect to each other.

4. A sealed joint between two opposed hollow members comprising, mating surfaces of flat rigid construction forming a closed cavity therebetween filled with a quantity of molecularly adhesive liquid in contact with the walls of the cavity.

* * * * *